(12) United States Patent
Boussard et al.

(10) Patent No.: US 9,728,009 B2
(45) Date of Patent: Aug. 8, 2017

(54) AUGMENTED REALITY BASED MANAGEMENT OF A REPRESENTATION OF A SMART ENVIRONMENT

(71) Applicant: Alcatel Lucent, Paris (FR)

(72) Inventors: Mathieu Boussard, Chailly-en-Biere (FR); Serge Papillon, Paris (FR); Benoit Christophe, Massy (FR)

(73) Assignee: Alcatel Lucent, Boulogne-Billancourt (FR)

( * ) Notice: Subject to any disclaimer, the term of this patent is extended or adjusted under 35 U.S.C. 154(b) by 144 days.

(21) Appl. No.: 14/264,194

(22) Filed: Apr. 29, 2014

(65) Prior Publication Data

US 2015/0310664 A1    Oct. 29, 2015

(51) Int. Cl.
| | |
|---|---|
| G06T 15/00 | (2011.01) |
| G06T 19/00 | (2011.01) |
| G06T 7/00 | (2017.01) |
| H04N 13/02 | (2006.01) |
| G06F 3/01 | (2006.01) |
| G06K 9/00 | (2006.01) |
| H04N 13/00 | (2006.01) |

(52) U.S. Cl.
CPC ............ G06T 19/006 (2013.01); G06F 3/017 (2013.01); G06K 9/00671 (2013.01); H04N 13/0271 (2013.01); H04N 13/0275 (2013.01); G06T 2207/10016 (2013.01); G06T 2207/10028 (2013.01); H04N 2013/0081 (2013.01); H04N 2013/0092 (2013.01)

(58) Field of Classification Search
None
See application file for complete search history.

(56) References Cited

U.S. PATENT DOCUMENTS

| | | | | |
|---|---|---|---|---|
| 2004/0022422 | A1* | 2/2004 | Yamauchi | G07C 9/00158 382/115 |
| 2006/0007304 | A1* | 1/2006 | Anderson | G06K 17/0022 348/91 |
| 2011/0276338 | A1* | 11/2011 | Warner | G06Q 50/22 705/2 |
| 2013/0169682 | A1* | 7/2013 | Novak | G02B 27/017 345/633 |
| 2014/0023335 | A1 | 1/2014 | O'Kelley et al. | |

OTHER PUBLICATIONS

Schall, G. et al., "Handheld augmented reality for underground infrastructure visualization," (2009), Personal and ubiquitous computing, 13(4), pp. 281-291.

(Continued)

*Primary Examiner* — Yingchun He
(74) *Attorney, Agent, or Firm* — Tong, Rea, Bentley & Kim, LLC

(57) ABSTRACT

A capability for managing a representation of a smart environment is presented herein. The capability for managing a representation of a smart environment is configured to support augmented reality (AR)-based management of a representation of a smart environment, which may include AR-based generation of a representation of the smart environment, AR-based alignment of the representation of the smart environment with the physical reality of the smart environment, and the like.

20 Claims, 9 Drawing Sheets

(56) References Cited

OTHER PUBLICATIONS

May, S. et al., "Robust 3D-mapping with time-of-flight cameras," Intelligent Robots and Systems, 2009, IROS 2009, IEEE/RSJ International Conference, pp. 1673-1678, Oct. 10-15, 2009.
Biswas, J. et al., "Depth camera based indoor mobile robot localization and navigation," Robotics and Automation (ICRA), 2012 IEEE International Conference, pp. 1697-1702, May 14-18, 2012.
Elias, R., et al., "An Accurate indoor localization technique using image matching," Intelligent Environments, 2007, IE 07, $3^{rd}$ IET International Conference, pp. 376-382, Sep. 24-25, 2007.
International Search Report and Written Opinion from corresponding PCT/IB2015/000635, mailed Oct. 30, 2015, pp. 1-12.

* cited by examiner

AUGMENTED REALITY BASED MANAGEMENT OF A REPRESENTATION OF A SMART ENVIRONMENT

TECHNICAL FIELD

The disclosure relates generally to management of environments and, more specifically but not exclusively, to augmented reality based management of representations of smart environments.

BACKGROUND

As the use of smart environments continues to grow, the complexity of such smart environments also continues to grow. For example, configuration of physical environments to include increasing numbers of Internet of Things (IoT) resources is becoming more popular, and is expected to continue to increase in the future. While such smart environments provide many benefits, use of smart environments typically requires significant administrative overhead, especially for smart environments using resources in complex scenarios. Additionally, the administrative overhead associated with use of smart environments may be exacerbated by use of resources prone to events or conditions requiring additional administration (e.g., resources that may be misplaced, moved around to different locations, prone to failure, and so forth). Accordingly, there is a need for improved mechanisms for administration of smart environments.

SUMMARY OF EMBODIMENTS

Various deficiencies in the prior art are addressed by embodiments for management of an environment.

In at least some embodiments, an apparatus includes a processor and a memory communicatively connected to the processor, where the processor is configured to determine a localization of a device within an environment including a physical area having a set of objects located therein and where the device has a field of view associated therewith, determine, based on the localization of the device, beacon localization information indicative of a localization of a beacon detected as being within the field of view of the device, determine, based on the beacon localization information, whether an object is registered as having a localization matching the localization of the beacon, and perform a management action based on the determination as to whether an object is registered as having a localization matching the localization of the beacon.

In at least some embodiments, a computer-readable storage medium stores instructions which, when executed by a computer, cause the computer to perform a method, the method including determining a localization of a device within an environment including a physical area having a set of objects located therein and where the device has a field of view associated therewith, determining, based on the localization of the device, beacon localization information indicative of a localization of a beacon detected as being within the field of view of the device, determining, based on the beacon localization information, whether an object is registered as having a localization matching the localization of the beacon, and performing a management action based on the determination as to whether an object is registered as having a localization matching the localization of the beacon.

In at least some embodiments, a method includes using a processor and a memory for determining a localization of a device within an environment including a physical area having a set of objects located therein and where the device has a field of view associated therewith, determining, based on the localization of the device, beacon localization information indicative of a localization of a beacon detected as being within the field of view of the device, determining, based on the beacon localization information, whether an object is registered as having a localization matching the localization of the beacon, and performing a management action based on the determination as to whether an object is registered as having a localization matching the localization of the beacon.

BRIEF DESCRIPTION OF THE DRAWINGS

The teachings herein can be readily understood by considering the detailed description in conjunction with the accompanying drawings, in which.

To facilitate understanding, identical reference numerals have been used, where possible, to designate identical elements common to the figures.

DETAILED DESCRIPTION OF EMBODIMENTS

A capability for managing a representation of a smart environment is presented herein. The capability for managing a representation of a smart environment may facilitate administration of the smart environment in a manner that leads to improvements in the operation and usage of the smart environment. The capability for managing a representation of a smart environment may be configured to support augmented reality (AR)-based management of a representation of a smart environment, which may include AR-based generation of a representation of the smart environment, AR-based alignment of the representation of the smart environment with the physical reality of the smart environment (or at least with a captured or measured version of the physical reality of the smart environment), and the like. Various embodiments of the capability for managing a representation of a smart environment may be better understood by considering an exemplary smart environment and associated management system configured to manage a representation of the smart environment, as depicted in FIG. 1.

Figure 1:
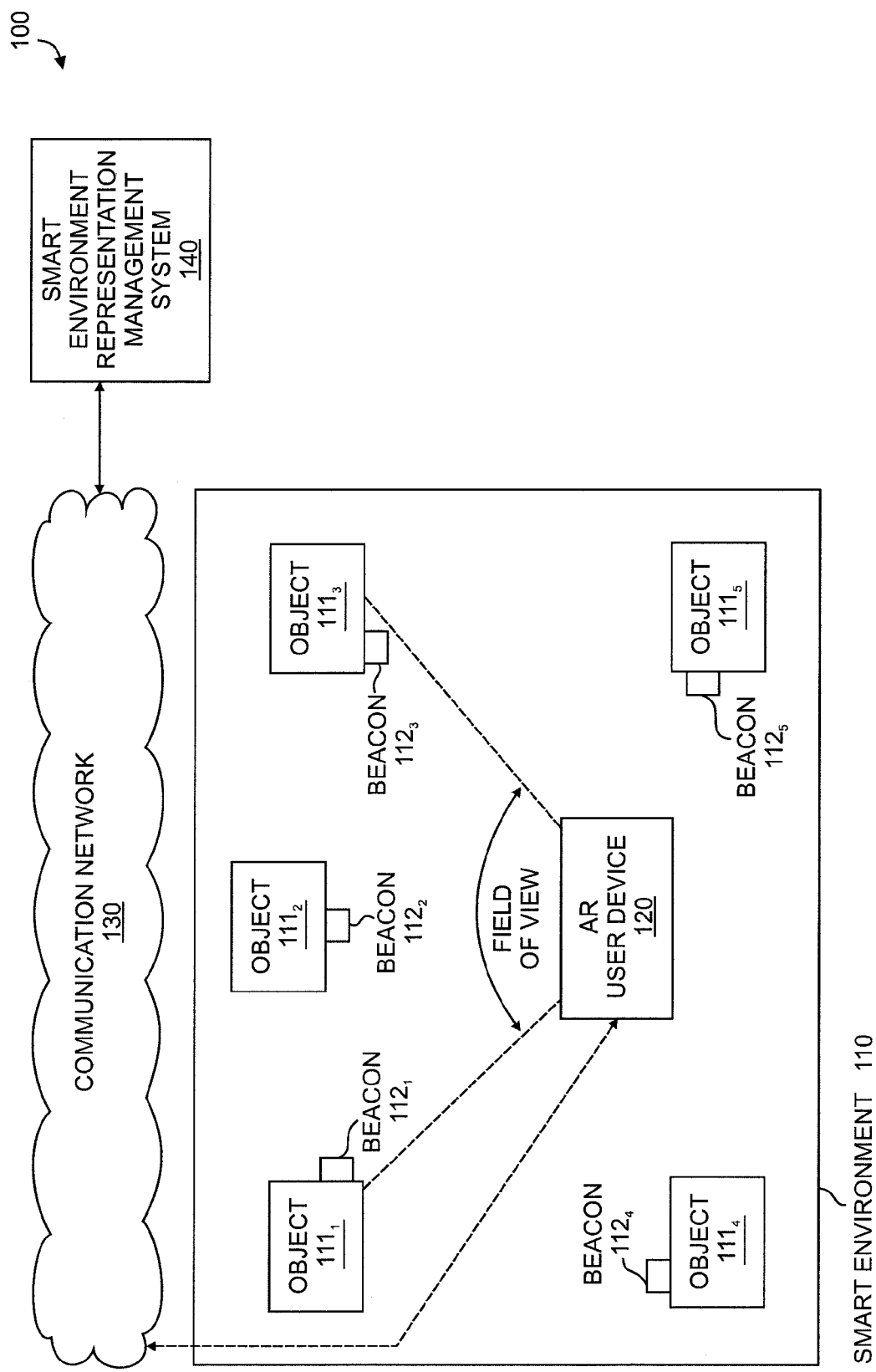
FIG. 1 depicts an exemplary system including a smart environment, an AR user device, and a smart environment representation management system.

FIG. 1 depicts an exemplary system including a smart environment and a smart environment representation management system.

The system 100 includes a smart environment 110, an AR user device 120, a communication network 130, and a smart environment representation management system 140.

The smart environment 110 is a location including a set of objects $111_1$-$111_5$ (collectively, objects 111) having a set of beacons $112_1$-$112_5$ (collectively, beacons 112) associated therewith, respectively. The location may be any suitable type of location which may support a smart environment, which may include an indoor location, an outdoor location, or combinations thereof. For example, the location may be a residential location, a portion of a residential location, a business location, a portion of a business location, a campus of an enterprise or university, a portion of a campus of an enterprise or university, a park, a portion of a park, a town or city, a portion of a town or city, or the like, as well as various combinations thereof. As indicated by the example above, the location may be of any suitable size (e.g., a room of a house, an entire house, a floor of a building, multiple floors of a building, a group of buildings, an open area outside of any buildings, a street or streets of a town or city, or the like, as well as various combinations thereof). It will be appreciated that the smart environment 110 may include fewer or more objects 111 and associated beacons 112.

The objects 111 may include any objects which may be located within a smart environment. For example, objects 111 may include sensors, actuators, media capture devices (e.g., microphones, cameras, or the like), media presentation devices (e.g., displays, speakers or the like), connected appliances (e.g., a refrigerator, curtains, or the like), or the like, as well as various combinations thereof. For example, objects 111 may include any objects which may be included in an Internet-of-Things (IoT) environment. The types of objects 111 located within smart environment 110 may depend on the location type of smart environment 110 (e.g., sensors and actuators within a home, actuators and security cameras within a business location, sensors and security cameras deployed on streets of a town or city, or the like). In general, a given object 111 may have object information associated therewith, such as object identification information for the object 111, object localization information indicative of a localization of the object 111 within the smart environment 110, object capability information of the object 111, object configuration information of the object 111, or the like, as well as various combinations thereof. The object identification information for the object 111 may include a unique object identifier of the object 111, an object type of the object 111, or the like. The object localization information indicative of localization of the object 111 within the smart environment 110 includes a position of the object 111 within the smart environment 110 (e.g., an absolute position of the object 111, a position of the object 111 relative to one or more reference points (e.g., one or more other objects 111, AR user device 120, or the like), or the like), and also may include an orientation of the object 111 within the smart environment 110 (e.g., a direction in which the object 111 is facing, a scope of influence of the object 111, or the like, as well as various combinations thereof). The object capability information of the object 111 may include functions or services available from the object 111, which, it will be understood, may depend on the object type of the object 111. The object capability information of the object 111 also may include capability information such as processing capability for media presentation objects, networking capabilities for network access gateways, camera resolution for cameras, and so forth, where types of capability information which may be associated with different types of objects 111 will be understood. The object configuration information of the object 111 may include information representing a current configuration of the object 111 which, it will be understood, may depend on the object type of the object 111. For example, the object configuration information of the object 111 may include a network address of the object 111, localization information associated with the object 111 as discussed above, two-dimensional or three-dimensional spatial scope of influence of the object 111, sensor threshold and range of the object 111 where the object 111 is a sensor, actuation alignment and range of the object 111 where the object 111 is an actuator, field of view and resolution of the object 111 where the object 111 is a camera, and so forth, where types of configuration information which may be associated with different types of objects 111 will be understood. It will be appreciated that, although omitted for purposes of clarity, at least some of the objects 111 may be configured to communicate with AR user device 120 (e.g., locally or via CN 130), at least some of the objects 111 may be configured to communicate via CN 130 (e.g., such as where network-hosted services may be available for use in controlling the objects 111), or the like. It will be appreciated that, although primarily depicted and described with respect to objects 111 that are smart objects, the objects 111 also or alternatively may include dumb objects which do not necessarily include any processing or networking capabilities (e.g., furniture, artwork, or the like).

The beacons 112 may include any beacons which may be detected by AR user device 120. The beacons 112 associated with objects 111 are configured to enable determination of localizations of associated objects 111 relative to the localization of the AR user device 120 within smart environment 110 (e.g., distance of the associated object 111 from AR user device 120, orientation of the associated object 111 with respect to AR user device 120, or the like). The beacons 112 may include one or more active beacons, one or more passive beacons, or the like, as well as various combinations thereof. In at least some embodiments, for a given object 111, the beacon 112 associated with the given object 111 may include a set of one or more light emitting devices. The light emitting devices may include diodes, lasers, or the like. The light emitting devices may be configured to emit visible light, infrared light, or the like. In at least some embodiments, for a given object 111, the associated beacon 112 for the given object 111 may be a known geometric pattern of light emitting devices (e.g., three light emitting diodes arranged in a triangle of known dimensions or orientation, four light emitting devices arranged in a square or rectangle of known dimensions or orientation, or the like). The beacons 112 may include one or more beacons having their own power sources, one or more beacons connected to their associated objects 111 so as to draw power from their associated objects 111, or the like, as well as various combinations thereof. In at least some embodiments, one or more of the beacons 112 may include passive beacons (e.g., beacons composed of a light absorbing material). In general, a given beacon 112 associated with a given object 111 may or may not be configured to convey object information associated with the object 111 (a distinction which is discussed in additional detail); however, where a given beacon 112 associated with a given object 111 is configured to convey object information associated with the object 111, the beacon 112 may convey the object information in any suitable manner (e.g., via a specific orientation or arrangement of light sources cooperating to provide the beacon 112, via a specific modulation of light emission by one or more light sources cooperating to provide the beacon 112, or the like). It will be appreciated that, although primarily depicted and described with respect to embodiments in which the beacons 112 are deployed with the associated objects 111, in at least some embodiments one or more of the beacons 112 may be provided for one or more of the objects 111 as needed (e.g., a user of AR user device 120 points a laser beam of a portable laser at an object 111 so as to provide an associated beacon 112 that enables detection of that object 111 by AR user device 120, a user of AR user device 120 carries a beacon 112 such that the user may temporarily or permanently attach the beacon 112 to an object 111 for enabling detection of that object 111 by AR user device 120, or the like, as well as various combinations thereof).

Figure 2:
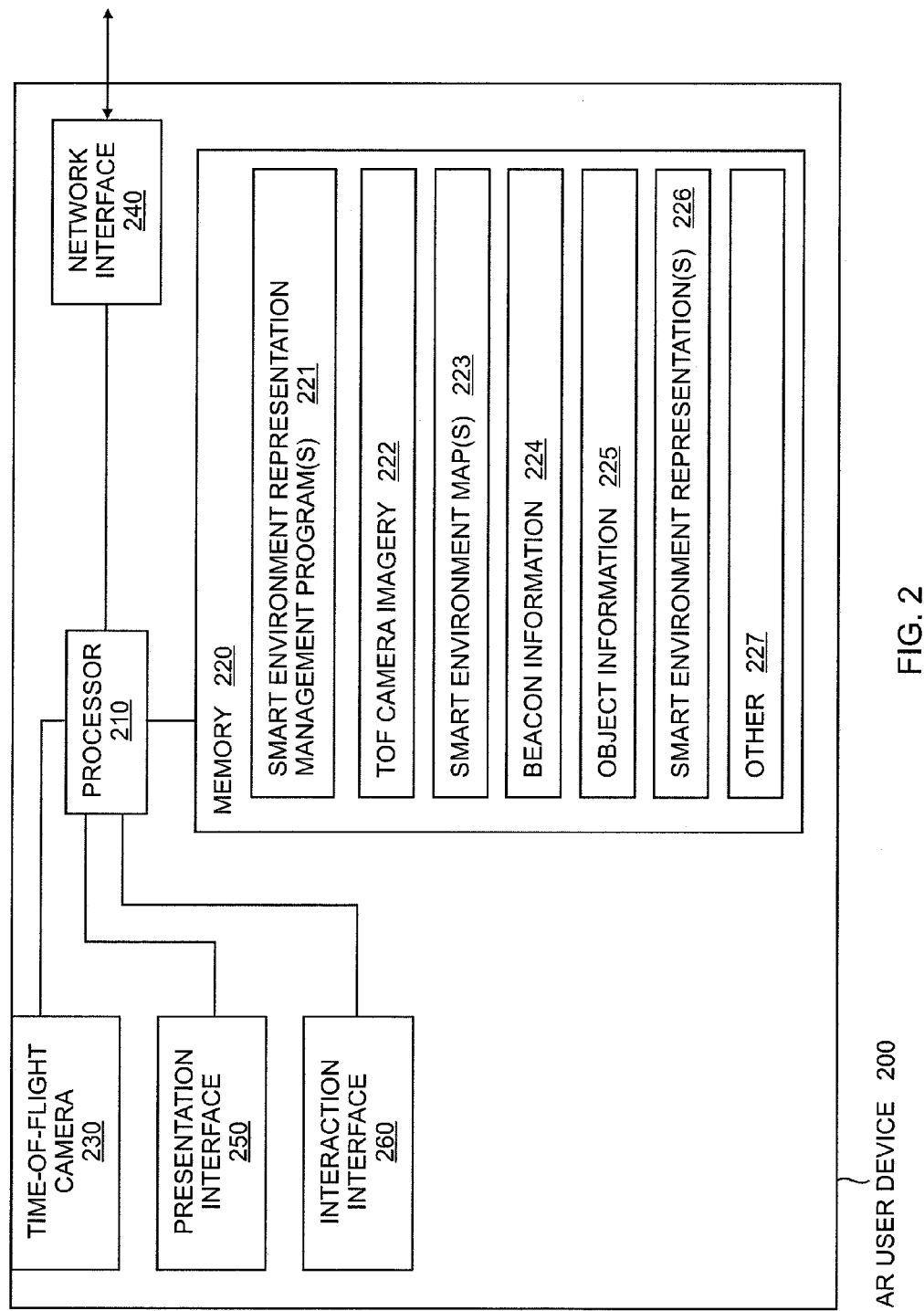
FIG. 2 depicts an exemplary embodiment of the AR user device depicted in FIG. 1.

The AR user device 120 is configured to support various functions of the capability for managing the representation of smart environment 110. The AR user device 120 is configured to support capture of imagery providing a depth map of the location of smart environment 110, detection of objects 111 via detection of the beacons 112 associated with objects 111, or the like, as well as various combinations thereof. The AR user device 120 may be transportable or wearable, such that a user of AR user device 120 may transport AR user device 120 to and within the smart environment 110 (e.g., for capturing imagery providing a depth map of the location of smart environment 110, detecting beacons 112, detecting objects 111 via detection of the beacons 112 associated with objects 111, and so forth). The AR user device 120 may support various processing capabilities, image capture and signal detection capabilities, networking capabilities, presentation capabilities, interaction capabilities, and the like, as discussed in additional detail below. For example, the AR user device 120 may be a smartphone, a tablet computer, a head-mounted device (e.g., glasses or other head-mounted device), or the like. An exemplary embodiment of AR user device 120 is depicted in FIG. 2. As depicted in FIG. 2, AR user device 200 includes a processor 210 that is communicatively connected to each of a memory 220, a time-of-flight (ToF) camera 230, a networking interface 240, a presentation interface 250, and an interaction interface 260. The processor 210 may cooperate with various other components of AR user device 200 to provide various functions of the capability for managing the representation of smart environment 110. The memory 220 is configured to store various types of programs and data, which may include a smart environment representation management program(s) 221 (e.g., any program(s) which may be executed by processor 221 to provide functions of AR user devices as discussed herein), ToF camera imagery 222, maps 223 of smart environment 110, beacon information 224 associated with beacons 112 (e.g., detected beacon information detected from beacons 112, registered beacon information that is registered as being associated with beacons 112, or the like), object information 225 associated with objects 111 (e.g., detected object information detected from objects 111 or from beacons 112 associated with objects 111, registered object information that is registered as being associated with objects 111, or the like), representation(s) 226 of smart environment 110, and other information 227 (e.g., other programs such as for controlling other elements of AR user device 200, other data, or the like, as well as various combinations thereof). The ToF camera 230 is configured to capture optical imagery in support of the capability for managing the representation of smart environment 110 (e.g., configured to capture a three-dimensional imagery of portions of smart environment 110 within the field of vision of the ToF camera, configured to detect beacons 112 associated with objects 111, or the like). The networking interface 240 is configured to support communication by AR user device 200 with smart environment representation management system 140 (e.g., transmitting imagery captured by the ToF camera 230 to smart environment representation management system 140 for use in performing management functions for managing the representation of smart environment 110, interaction with smart environment representation management system 140 within the context of determining a latest version of the representation of smart environment 110, receiving from smart environment representation management system 140 a latest version of the representation of smart environment 110 for presentation at AR user device 120, or the like, as well as various combinations thereof). The presentation interface 250 (e.g., one or more display screens, one or more speakers, or the like) is configured to support presentation of information at AR user device 120 (e.g., ToF camera imagery 222, maps 223 of smart environment 110, beacon information 224 associated with beacons 112, object information 225 associated with objects 111, representation(s) 226 of smart environment 110, and other information 227, options for selection by a user of AR user device 120 within the context of managing the representation of smart environment 110, or the like, as well as various combinations thereof). The interaction interface 260 (e.g., touch screen controls, buttons, or the like) is configured to support interaction by a user of AR user device 120 with information presented at AR user device 120 (e.g., for enabling the user to access information related to the representation of smart environment 110, enabling the user to specify configuration information and selections within the context of managing the representation of smart environment 110, or the like). It will be appreciated that AR user device 200 of FIG. 2 merely represents one possible implementation of AR user device 120 of FIG. 1 and, thus, further description of capabilities of AR user device 120 continues within the context of FIG. 1. The AR user device 120 may support any functions depicted and described with respect to AR user devices 200 of FIG. 2, as well as any other functions depicted and described herein as being performed by an AR user device.

The CN 130 may include one or more communication networks configured to support communications associated with providing various functions of the capability for managing the representation of smart environment 110. The CN 130 is configured to support communication between AR user device 120 and smart environment representation management system 140. The CN 130 may include one or more wireless access networks (e.g., Wireless Fidelity (WiFi), cellular, or the like) via which AR user device 120 may communicate with smart environment representation management system 140, one or more wireline networks which may support communication between the one or more wireless access networks and the smart environment representation management system 140, or the like, as well as various combinations thereof.

Figure 3:
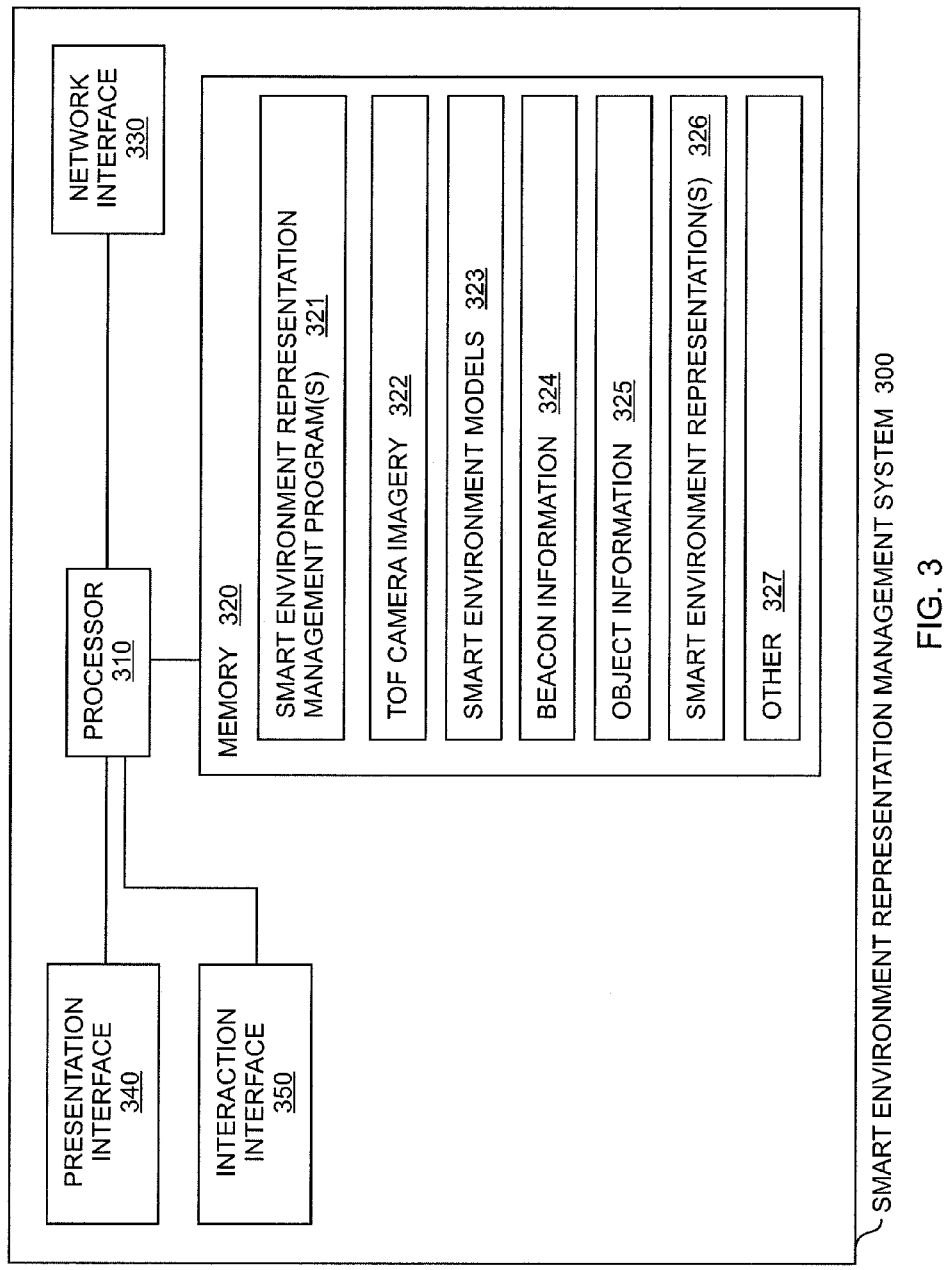
FIG. 3 depicts an exemplary embodiment of the smart environment representation management system depicted in FIG. 1.

The smart environment representation management system 140 is configured to support various functions of the capability for managing the representation of smart environment 110. The smart environment representation management system 140 may be configured to generate a representation of smart environment 110, which may include creating an initial representation of smart environment 110, updating an existing representation of smart environment 110, supporting alignment of the representation of the smart environment 110 with the physical reality of the smart environment 110, or the like, as well as various combinations thereof. The smart environment representation management system 140 may include various capabilities for supporting functions of the capability for managing the representation of smart environment 110, as discussed in additional detail below. An exemplary embodiment of the smart environment representation management system 140 is depicted in FIG. 3. As depicted in FIG. 3, smart environment representation management system 300 includes a processor 310 that is communicatively connected to each of a memory 320, a networking interface 330, a presentation interface 340, and an interaction interface 350. The processor 310 may cooperate with various other components of smart environment representation management system 300 to provide various functions of the capability for managing the representation of smart environment 110. The memory 320 is configured to store various types of programs and data, which may include a smart environment representation management program(s) 321 (e.g., any program(s) which may be executed by processor 321 to provide functions of a smart environment representation management system as discussed herein), ToF camera imagery 322 received from AR user device 120, models 323 of smart environment 110, beacon information 324 associated with beacons 112 (e.g., detected beacon information detected from beacons 112, registered beacon information that is registered as being associated with beacons 112, or the like), object information 325 associated with objects 111 (e.g., detected object information detected from objects 111 or from beacons 112 associated with objects 111, registered object information that is registered as being associated with objects 111, or the like), representation(s) 326 of smart environment 110, and other information 327 (e.g., other programs such as for controlling other elements of smart environment representation management system 300, other data, or the like, as well as various combinations thereof). The networking interface 330 is configured to support communication with AR user device 120 (e.g., receiving imagery captured by the ToF camera for use in performing management functions for managing the representation of smart environment 110, interaction with AR user device 120 within the context of determining a latest version of the representation of smart environment 110, providing to AR user device 120 a latest version of the representation of smart environment 110 for presentation at AR user device 120, or the like, as well as various combinations thereof). The presentation interface 340 (e.g., one or more display screens, one or more speakers, or the like) is configured to support presentation of information at smart environment representation management system 300 (e.g., presentation of models 323 of smart environment 110, beacon information 324 associated with beacons 112, object information 325 associated with objects 111, representation(s) 326 of smart environment 110, other information 327, options for selection by a user of AR user device 120 within the context of managing the representation of smart environment 110, or the like, as well as various combinations thereof). The interaction interface 350 (e.g., touch screen controls, buttons, or the like) is configured to support interaction by a user of smart environment representation management system 300 with information presented at smart environment representation management system 300 (e.g., for enabling the user to access information related to the representation of smart environment 110, enabling the user to specify configuration information and selections within the context of managing the representation of smart environment 110, or the like). It will be appreciated that smart environment representation management system 300 of FIG. 3 merely represents one possible implementation of smart environment representation management system 140 of FIG. 1 and, thus, further description of capabilities of smart environment representation management system 140 continues within the context of FIG. 1. The smart environment representation management system 140 may support any functions depicted and described with respect to smart environment representation management system 300 of FIG. 3, as well as any other functions depicted and described herein as being performed by a smart environment representation management system.

Figure 4:
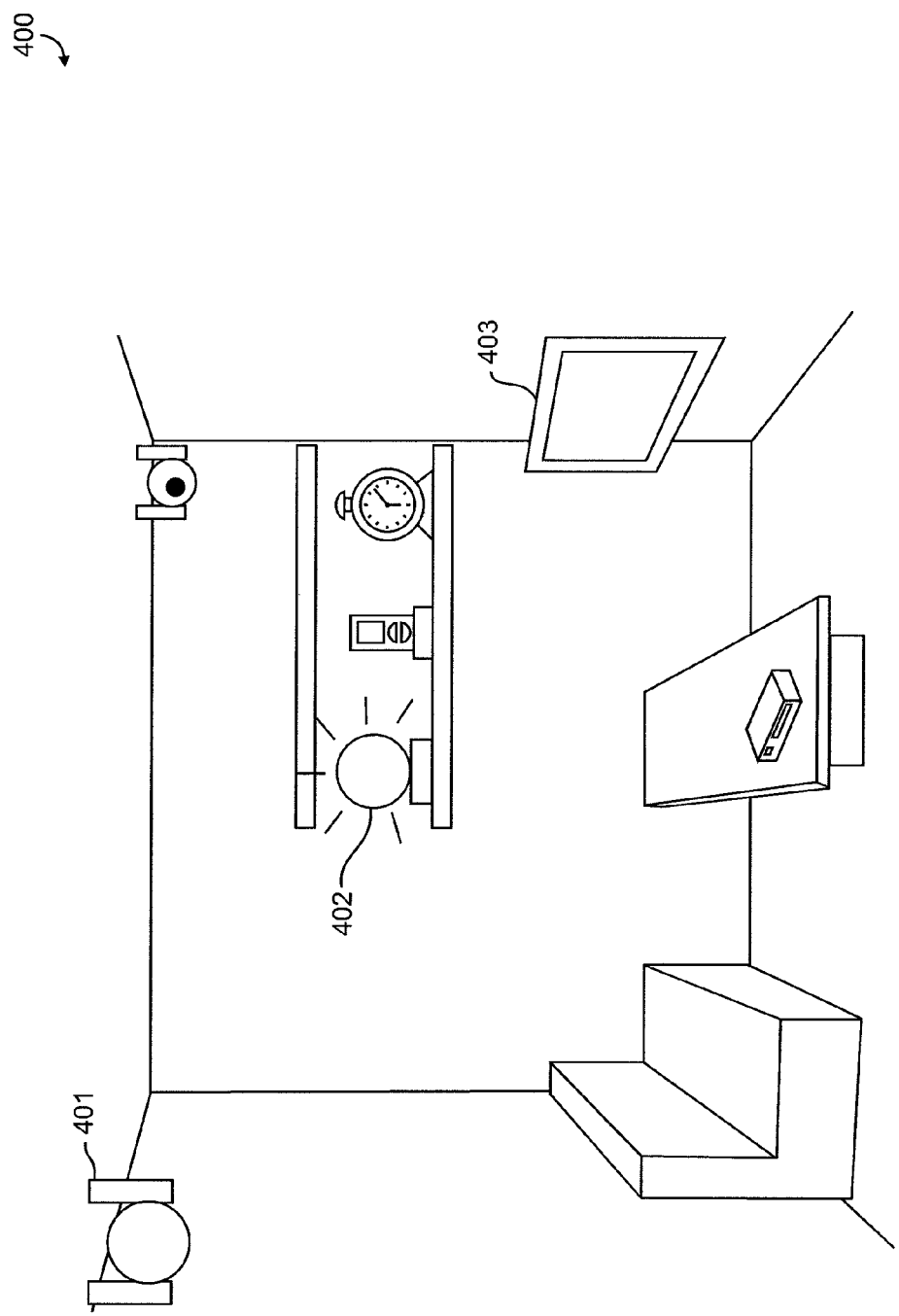
FIG. 4 depicts an exemplary representation of a portion of the smart environment depicted in FIG. 1.

The smart environment representation management system 140 may be configured to generate a representation of the smart environment 110. The smart environment representation management system 140 may be configured to generate a representation of the smart environment 110 by augmenting a model of smart environment 110 to include indications of the localizations of the objects 111 within smart environment 110 (e.g., at least the positions and, optionally, orientations). The model of the smart environment 110 may be a three-dimensional model of the smart environment 110. The model of the smart environment 110 may be a graphical representation of smart environment 110 (e.g., drawn using a computer-aided drafting (CAD) tool, an image-based representation of smart environment 110 (e.g., a depth map of smart environment 110 that is captured by the ToF camera of AR user device 120), or the like. The localizations of the objects 111 within the smart environment 110 are determined by smart environment representation management system 140 based on reference object localization information for the objects 111, which is stored by smart environment representation management system 140 for smart environment 110. The object information received from AR user device 120 may be used by smart environment representation management system 140 to generate the representation of smart environment 110 and then stored by smart environment representation management system 140 or may be stored by smart environment representation management system 140 and then used by smart environment representation management system 140 to generate the representation of smart environment 110; however, in either case, the object information received from AR user device 120 is stored as part of the object information of smart environment representation management system 140 such that it may be accessed by smart environment representation management system 140 in order to generate a representation of the smart environment 110. In other words, the object information maintained by smart environment representation management system 140 provides a set of reference object information which may be used by smart environment representation management system 140 in providing various management functions associated with the representation of smart environment 110. The reference object localization information for the objects 111 that is eventually stored by smart environment representation management system 140 is determined based on imagery captured by the ToF camera of AR user device 120. Namely, localizations of objects 111 within smart environment 110 may be determined by determining a localization of the AR user device 120 within smart environment 110 (e.g., based on a model of the smart environment 110 and the ToF camera imagery from the ToF camera of AR user device 120, based on a precise localization technique, or the like), detecting objects 111 within the smart environment 110 based on detection of beacons 112 associated with the objects 111, and determining localizations of the objects 111 within the smart environment 110 based on the localization of the AR user device 120 within smart environment 110 and information associated with detection of the objects 111 within the smart environment 110. The smart environment representation management system 140 may be configured to augment a model of smart environment 110 to include indications of the localizations of the objects 111 within smart environment 110 by (a) identifying the localizations of the objects 111 within the model of smart environment 110 based on the reference object localization information associated with the objects 111 and (b) augmenting the model of smart environment 110 to include indications of the localizations of the objects 111 within smart environment 110. The indications of the localizations of the objects 111 within smart environment 110 may be provided by, for each of the objects 111, identifying a position of the object 111 within the three-dimensional model of the smart environment 110 that corresponds to an actual position of the object 111 within the smart environment 110 and associating an indicator (e.g., an icon or any other suitable indicator) with the identified position of the object 111 within the three-dimensional model of the smart environment 110. The indicators representing the objects 111 within the representation of smart environment 110 may have object information associated therewith (e.g., object identification information, object localization information, object capability information, object configuration information, or the like, as well as various combinations thereof). The indicators representing the objects 111 within the representation of smart environment 110 may be selectable (e.g., via an interaction interface of AR user device 120, an interaction interface of smart environment representation management system 140, an interaction interface of any other device on which the representation of smart environment 110 may be presented, or the like) so as to enable presentation of object information of objects 111, configuration of representations of objects 111 within the representation of smart environment 110 (e.g., modification of registered configuration information stored for the objects 111), communication with or configuration of the objects 111 themselves, or the like, as well as various combinations thereof. An exemplary representation of the portion of smart environment 110 that is within the field of vision of AR user device 120 is depicted in FIG. 4. As depicted in FIG. 4, the portion of smart environment 110 that is within the field of vision of AR user device 120 includes part of a living room of a home (including objects $111_1$, $111_2$, and $111_3$ having beacons $112_1$, $112_2$, and $112_3$ associated therewith, respectively) and, thus, representation 400 of the portion of smart environment 110 that is within the field of vision of AR user device 120 includes an image of that part of the living room of the home that has been augmented to include icon 401 (associated with object $111_1$, which is depicted as being a security camera), icon 402 (associated with object $111_2$, which is depicted as being a light), and icon 403 (associated with object $111_3$, which is depicted as being a television).

Figure 5:
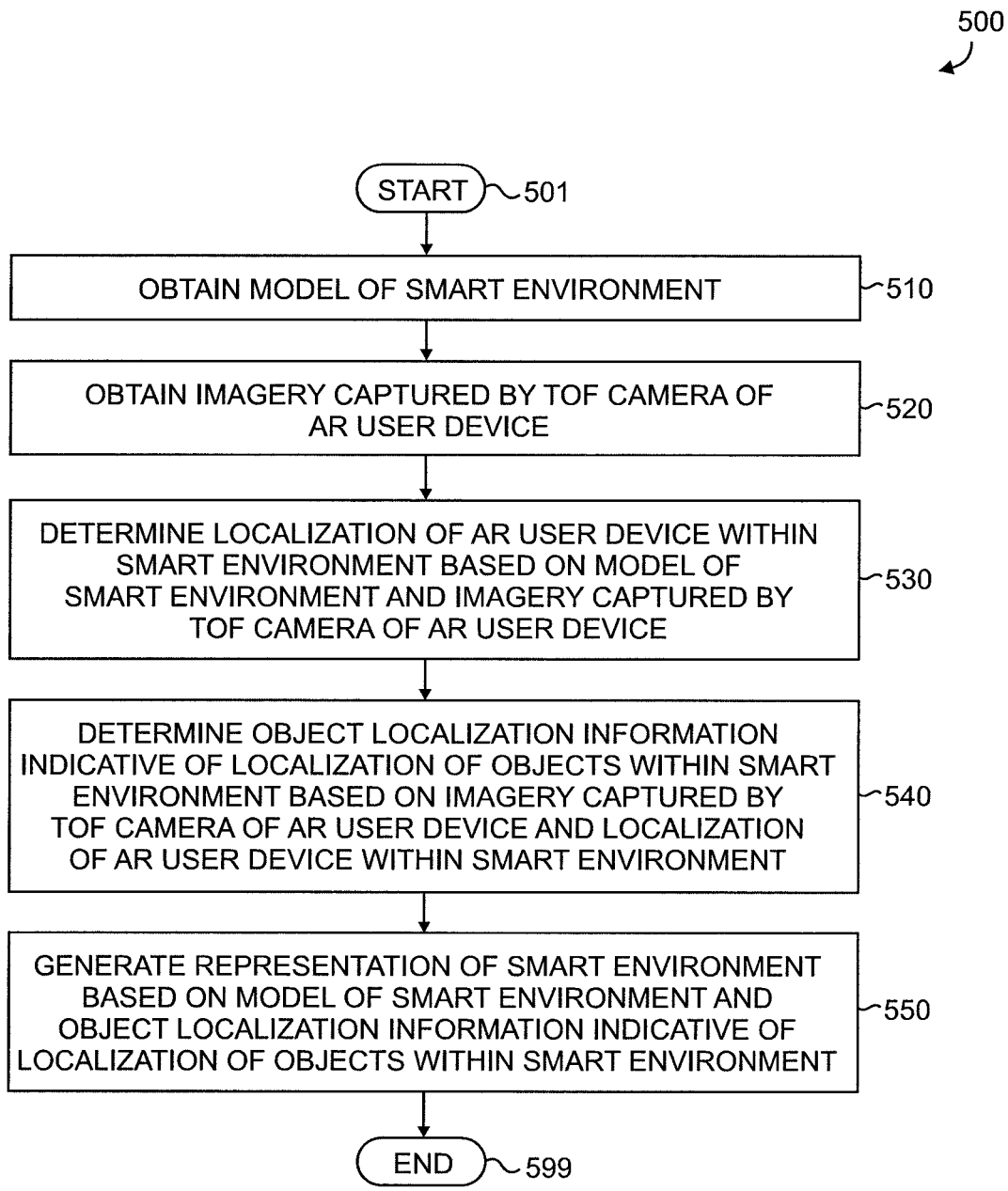
FIG. 5 depicts an exemplary embodiment of a method for generating a representation of a smart environment.

FIG. 5 depicts an exemplary embodiment of a method for generating a representation of a smart environment. It will be appreciated that the steps of method 500 may be performed by the AR user device, performed by the smart environment representation management system, or distributed across the AR user device and the smart environment representation management system. It will be appreciated that, although primarily depicted and described as being performed serially, at least a portion of the steps of method 500 may be performed contemporaneously or in a different order than presented in FIG. 5.

At step 501, method 500 begins.

At step 510, a model of a smart environment is obtained. The smart environment is a physical area including a set of objects and a set of beacons associated with the objects.

At step 520, imagery captured by a ToF camera of the AR user device is obtained. The ToF camera imagery is imagery of the physical area, which may include imagery of all or part of the physical area. The capture of the ToF camera imagery also may include, or otherwise have associated therewith, detection of the beacons located within the physical area. The beacons are associated with the objects located within the physical area and, thus, detection of the beacons also may be considered to be, or may be used for, detection of the associated objects that are associated with the detected beacons.

At step 530, a localization of the AR user device within the smart environment is determined. The localization of the AR device within the smart environment may be determined based on the model of the smart environment and the ToF camera imagery (e.g., based on comparison of a depth map of the smart environment that is captured by the ToF camera of the AR user device with a reference model of the smart environment, which may be a model of smart environment or a current or previous version of a representation of the smart environment), based on a precise localization technique (e.g., GPS positioning for an outdoor smart environment, indoor localization for an indoor smart environment, or the like), or the like, as well as various combinations thereof.

At step 540, object localization information indicative of localization of the objects within the smart environment is determined based on the ToF camera imagery and the localization of the AR user device within the smart environment. The object localization information may be determined by, for each detected beacon, determining a localization of the beacon within the smart environment, based on the ToF camera imagery and the localization of the AR user device within the smart environment, determining the object associated with the detected beacons, and using the beacon localization information of the beacon as the object localization information of the object associated with the beacon.

At step 550, a representation of the smart environment is generated based on the model of the smart environment and the object localization information indicative of localization of the objects within the smart environment. The generation of the representation of the smart environment may include augmenting the model of the smart environment to include indications of the objects located within the smart environment where the indications of the objects located within the smart environment are provided in accordance with the object localization information of the objects located within the smart environment (thereby providing indications of localizations of the objects within the smart environment). The object indicators that are included within the representation of the smart environment may have other types of object information associated therewith (e.g., object identifier information, object capability information, object configuration information, object status information, or the like, as well as various combinations thereof). The representation of the smart environment also may include indications of spatial scopes of influence for one or more of the objects (e.g., an indication of a sensing range of a sensor object, an indication of an actuator range of an actuator object, an indication of an field of view of a security camera, an indication of a display range of a display device, and so forth). It will be appreciated that the generated representation of the smart environment may be stored locally (e.g., at the smart environment representation management system), propagated to a remote device (e.g., from the smart environment representation management system to the AR user device for presentation at the AR user device), presented via a presentation interface (e.g., presented at the smart environment representation management system or the AR user device), or the like, as well as various combinations thereof.

At step 599, method 500 ends.

Figure 6:
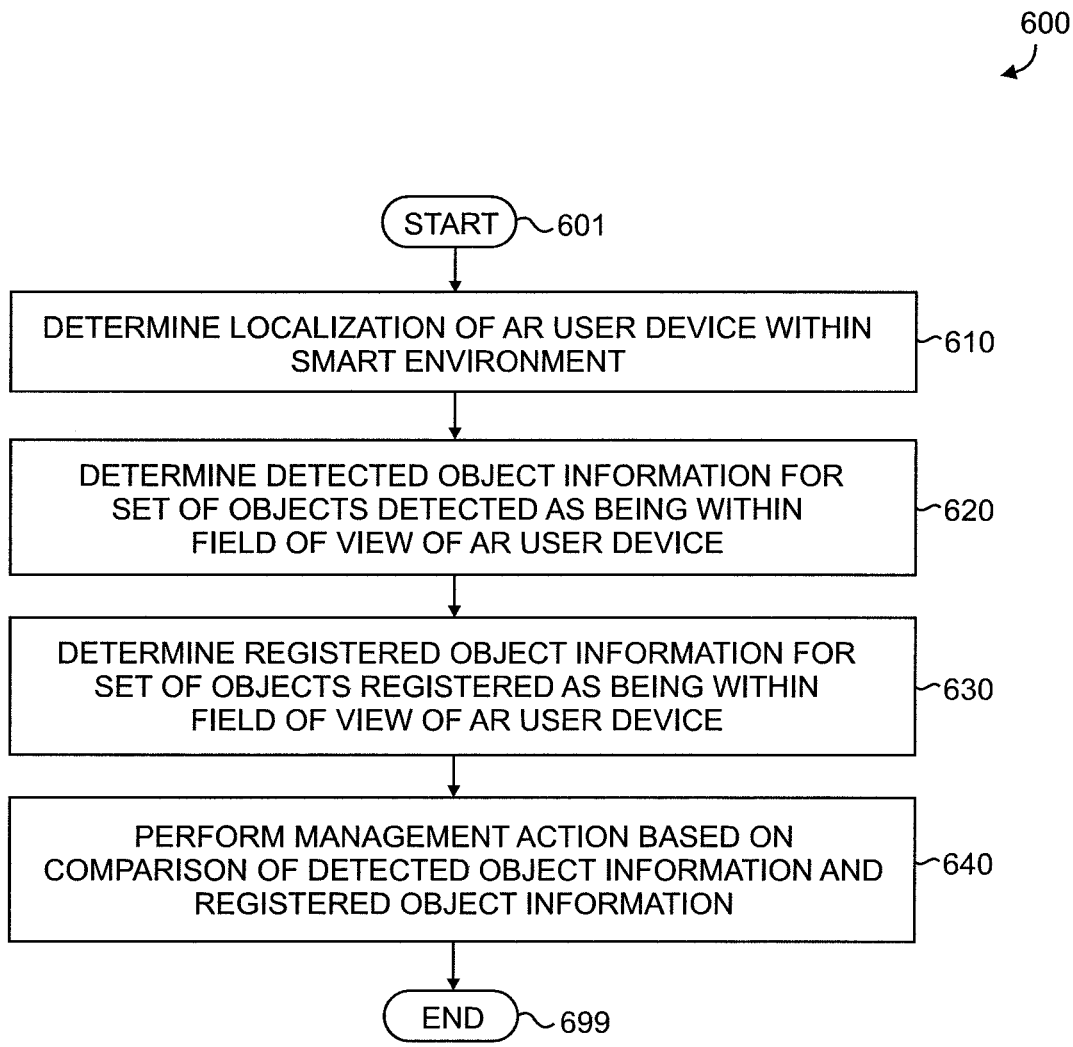
FIG. 6 depicts an exemplary embodiment of a method for performing a management action based on detected object information and registered object information.

FIG. 6 depicts an exemplary embodiment of a method for performing a management action based on detected object information and registered object information. The method 600 is primarily depicted and described within the context of functions that are performed by a smart environment representation management system to generate a representation of a smart environment based on information received from an AR user device; however, it will be appreciated that the various functions depicted and described as being performed by the smart environment representation management system may be distributed or otherwise provided in various other ways. It will be appreciated that, although primarily depicted and described as being performed serially, at least a portion of the steps of method 600 may be performed contemporaneously or in a different order than presented in FIG. 6.

At step 601, method 600 begins.

At step 610, a localization of the AR user device within the smart environment is determined. The localization of the AR user device within the smart environment may be determined based on a model of the smart environment and imagery captured by a ToF camera of the AR user device. The model of the smart environment may include a reference model of the smart environment (e.g., where a representation of the smart environment has not yet been created), a previous version of the representation of the smart environment, or the like. The imagery captured by the ToF camera of the AR user device may include a depth map of the smart environment. The localization of the AR user device within the smart environment may be determined by matching information from the model of the smart environment with information included in the imagery captured by the ToF camera of the AR user device. The matching may be based on image recognition capabilities, historical information, reference points (e.g., one or more objects 111, beacons 112 associated with one or more objects 111, or the like), or the like, as well as various combinations thereof. The localization of the AR user device within the smart environment may include a position of the AR user device within the smart environment (e.g., an absolute position, a relative position, or the like), an orientation of the AR user device within the smart environment (e.g., the direction in which the AR user device is facing, a representation of the field of view of the AR user device, or any other suitable orientation information), or the like. The localization of the AR user device within the smart environment may be (1) determined on the AR user device (e.g., where the AR user device receives a model of the smart environment from the smart environment representation management system) and provided to the smart environment representation management system, or (2) determined on the smart environment representation management system (e.g., where the AR user device provides the imagery captured by the ToF camera of the AR user device to the smart environment representation management system). The localization of the AR device within the smart environment may be determined based on a precise localization technique (e.g., GPS positioning for an outdoor smart environment, indoor localization for an indoor smart environment, or the like).

At step 620, detected object information, for a set of objects detected as being within the field of view of the AR user device, is determined. The set of objects detected as being within the field of view of the AR user device is determined by detecting beacons, associated with the objects, within the field of view of the AR user device based on imagery captured by the ToF camera of the AR user device. The detected object information for the detected objects may include detected object identification information for the detected objects, detected object localization information for the detected objects (e.g., information indicative of positions and, optionally, orientations of the detected objects within the smart environment), or the like, as well as various combinations thereof. The detected object localization information for the set of detected objects may be determined based on the localization of the AR user device within the smart environment. The detected object localization information for the detected objects may be absolute object localization information indicative of the absolute positions of the detected objects within the smart environment, which may be determined based on relative object localization information indicative of positions of the detected objects within the smart environment relative to the AR user device as well as based on the localization of the AR user device within the smart environment. The detected object information for the detected objects also may include other types of detected object information for the detected objects. The detected object information for the set of detected objects may be determined on the AR user device and provided to the smart environment representation management system or determined on the smart environment representation management system based on information received from the AR user device; however, it will be appreciated that, in either case, the detected object information includes information obtained locally by the AR user device at the smart environment based on detection of beacons of the smart environment by the AR user device at the smart environment. The detected object information, for the set of objects detected as being within the field of view of the AR user device, also may have associated therewith detected beacon information for beacons detected by the AR user device as being within the field of view of the AR user device. The AR user device has a field of view associated therewith.

At step 630, registered object information, for a set of objects registered as being within the field of view of the AR user device, is determined. The set of objects registered as being within the field of view of the AR user device may be determined, based on the localization of the AR user device within the smart environment, by determining the field of view of the AR user device within the smart environment based on the localization of the AR user device within the smart environment and determining the set of objects registered as being within the field of view of the AR user device from stored information (e.g., stored object information that is maintained for the smart environment, an existing representation of the smart environment that includes indications of the positions of objects within the smart environment, or the like, as well as various combinations thereof). The registered object information, for the set of objects registered as being within the field of view of the AR user device, is determined from stored information associated with the smart environment (as opposed to being determined from the objects themselves, via detection of beacons associated with the objects based on imagery captured by the ToF camera of the AR user device, as discussed above with respect to determination of detected object information for the set of objects detected as being within the field of view of the AR user device). The registered object information for the registered objects includes registered object identification information for the registered objects and registered object localization information for the registered objects (e.g., information indicative of positions and, optionally, orientations of the registered objects within the smart environment). The registered object localization information for the registered objects may be absolute object localization information (e.g., absolute positions of the registered objects within the smart environment, positions of the registered objects within the smart environment relative to localization of the AR user device within the smart environment, or the like). The registered object information for the registered objects also may include other types of registered object information for the registered objects. The registered object information, for the set of objects registered as being within the field of view of the AR user device, also may have associated therewith registered beacon information for beacons registered as being within the field of view of the AR user device.

At step 640, a management action is performed based on a comparison of the detected object information and the registered object information. The management action may include one or more of evaluating detected objects with respect to registered objects for aligning the representation of the smart environment with the physical reality of the smart environment (e.g., an exemplary embodiment of which is depicted and described with respect to FIG. 7), generating a representation of the smart environment, or the like, as well as various combinations thereof. It will be appreciated that, where combinations of such management actions are performed, the representation of the smart environment may be generated after evaluation of the detected objects is complete, as each detected object is evaluated (e.g., display of the representation of the smart environment on AR user device or smart environment representation management system may be refreshed, after each evaluation of each of the detected objects that results in a change to registered object information upon which generation of the representation of the smart environment is based, so that any users viewing the display of the representation of the smart environment may see the progress in ensuring alignment of the representation of the smart environment with the physical reality of the smart environment), or the like.

At step 699, method 600 ends. It will be appreciated that, although depicted and described as ending (for purposes of clarity), method 600 may continue to be performed or may be re-executed under various conditions (e.g., periodically as the user of the AR user device moves around the smart environment and the AR user device captures more imagery of the smart environment, responsive to a manual indication by a user of the AR user device for the AR user device to capture more imagery of the smart environment, or the like, where these and other usage scenarios are discussed in additional above).

Figure 7:
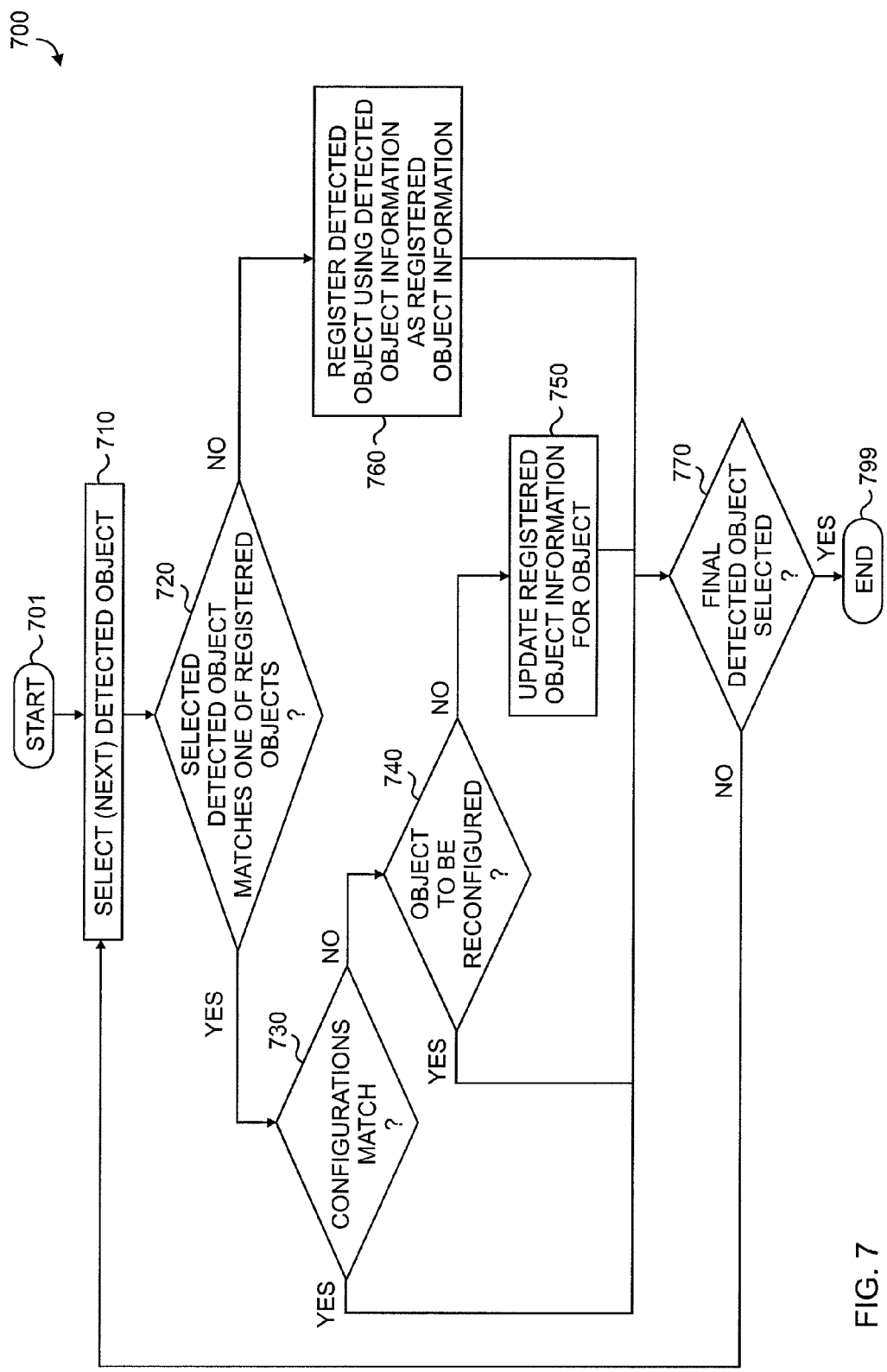
FIG. 7 depicts an exemplary embodiment of a method for aligning the representation of the smart environment with the physical reality of the smart environment.

FIG. 7 depicts an exemplary embodiment of a method for aligning the representation of the smart environment with the physical reality of the smart environment. The method 700 is primarily depicted and described within the context of functions that are performed by a smart environment representation management system to generate a representation of a smart environment based on information received from an AR user device; however, it will be appreciated that the various functions depicted and described as being performed by the smart environment representation management system may be distributed or otherwise provided in various other ways. It will be appreciated that method 700 may be used as step 640 of method 600 of FIG. 6. It will be appreciated that, although primarily depicted and described as being performed serially, at least a portion of the steps of method 700 may be performed contemporaneously or in a different order than presented in FIG. 7.

At step 701, method 700 begins.

At step 710, one of the detected objects in the set of detected objects is selected.

At step 720, a determination is made as to whether the selected one of the detected objects matches any of the registered objects in the set of registered objects. (e.g., maintained by the smart environment representation management system for use in managing the representation of the smart environment). The determination as to whether the selected one of the detected objects matches any of the registered objects may include comparing the detected object information of the selected one of the detected objects to respective registered object configuration information associated with the registered objects. The determination as to whether the selected one of the detected objects matches any of the registered objects may include a determination as to whether a detected object identifier of the selected one of the detected objects matches one of the registered object identifiers of one of the registered objects. The determination as to whether the selected one of the detected objects matches any of the registered objects may include a determination as to whether object localization information of the selected one of the detected objects matches object localization information of one of the registered objects. If the selected one of the detected objects matches one of the registered objects in the set of registered objects, method 700 proceeds to step 730 (e.g., for further evaluation of the object). If the selected one of the detected objects does not match any registered objects in the set of registered objects, method 700 proceeds to step 760 (e.g., for registration of the selected one of the detected objects).

At step 730, a determination is made as to whether the detected configuration of the object matches the registered configuration of the object. The determination as to whether the detected and registered configurations of the object match may include a determination as to whether the detected localization of the object matches the registered localization of the object. The determination as to whether the detected localization of the object matches the registered localization of the object may include a determination as to whether the detected position (and, optionally, detected orientation) of the object matches the registered position (and, optionally, registered orientation) of the object. If the detected and registered configurations of the object match, method 700 proceeds to step 770. If the detected and registered configurations of the object do not match, method 700 proceeds to step 740.

At step 740, a determination is made as to whether the object is to be reconfigured. This determination may be made automatically (e.g., based on a setting indicative that a detected object having a detected configuration that is different than the registered configuration of that object is to be reconfigured such that the detected object has a configuration matching the registered configuration for that object, or a setting indicative that a detected object having a detected configuration that is different than the registered configuration of that object is not to be reconfigured but that the registered configuration information for the object is to be updated such that the registered configuration information for the object matches the reality of the configuration of the object), responsive to a detection of a manual selection by a user via the AR user device when the user is presented with an indication that the detected configuration of the object does not match the registered configuration of the object), or the like, as well as various combinations thereof. It will be appreciated that such settings or presentations of indications to users may be applied at any suitable granularity (e.g., for all objects of the smart environment, for a subset of objects of the smart environment (e.g., based on one or more of object type, object location, or the like), or the like, as well as various combinations thereof). If the object is to be reconfigured, method 700 proceeds to step 770 (where, here, it is assumed that the object will be reconfigured at some time and in some manner which is considered to be outside of the scope of method 700, although it will be appreciated that method 700 may be adapted to include a step in which the user of the AR user device is presented with an indication that the object needs to be reconfigured). If the object is not to be reconfigured, method 700 proceeds to step 750.

At step 750, the registered configuration information for the object is updated based on the detected configuration information for the object. The registered configuration information for the object is used in the creation or updating of the representation of the smart environment and, thus, updating of the registered configuration information for the object will be reflected in subsequent representations of the smart environment, as indicated in step 770 (to which method 700 proceeds from step 750).

At step 760, the detected object is registered using the detected object information for the object as the registered object information for the object. The registered object information for the object may then be used to generate the representation of the smart environment and, thus, subsequent representations of the smart environment will reflect the presence of the detected object within the smart environment).

At step 770, a determination is made as to whether the final detected object in the set of detected objects has been selected. If the final detected object in the set of detected objects has not been selected, method 700 returns to step 710 (at which point a next detected object in the set of detected objects is selected for evaluation). If the final detected object in the set of detected objects has not been selected, method 700 proceeds to step 799, where method 700 ends.

At step 799, method 700 ends. It will be appreciated that, although depicted and described as ending (for purposes of clarity), method 700 may continue to be performed or may be re-executed under various conditions (e.g., each time method 600 is re-executed where method 700 is used to provide step 640 of method 600, in order to provide or support one or more additional management actions, or the like).

Figure 8:
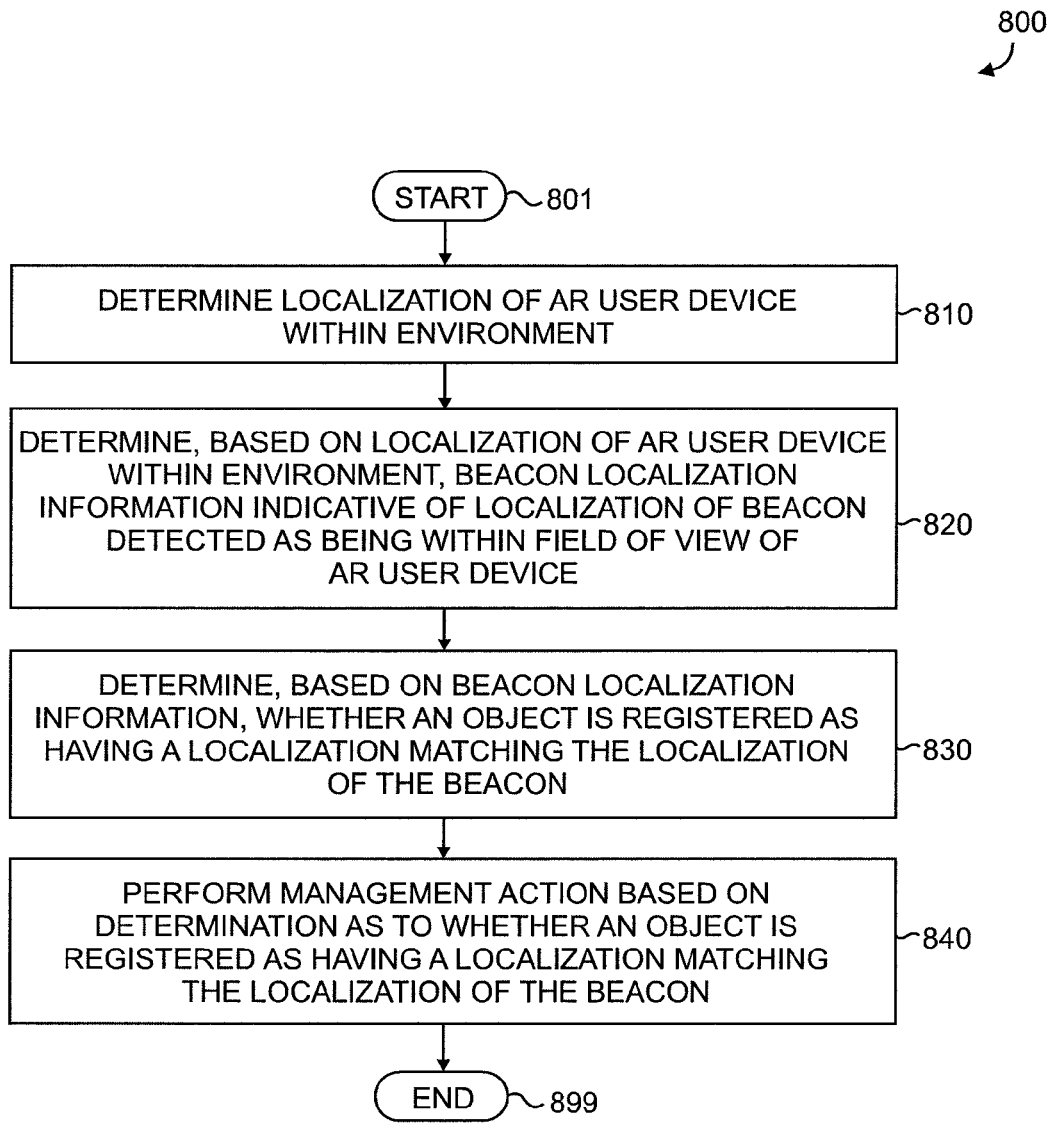
FIG. 8 depicts an exemplary embodiment of a method for performing a management action for an environment.

FIG. 8 depicts an exemplary embodiment of a method for performing a management action for an environment. The method 800 is primarily depicted and described within the context of functions that are performed by a smart environment representation management system to generate a representation of a smart environment based on information received from an AR user device; however, it will be appreciated that the various functions depicted and described as being performed by the smart environment representation management system may be distributed or otherwise provided in various other ways. It will be appreciated that, although primarily depicted and described as being performed serially, at least a portion of the steps of method 800 may be performed contemporaneously or in a different order than presented in FIG. 8.

At step 801, method 800 begins.

At step 810, a localization of the AR user device within the environment is determined. The localization of the AR user device within the smart environment may be determined based on a model of the smart environment and imagery captured by a ToF camera of the AR user device. The model of the smart environment may include a reference model of the smart environment (e.g., where a representation of the smart environment has not yet been created), a previous version of the representation of the smart environment, or the like. The imagery captured by the ToF camera of the AR user device may include a depth map of the smart environment. The localization of the AR user device within the smart environment may be determined by matching information from the model of the smart environment with information included in the imagery captured by the ToF camera of the AR user device. The matching may be based on image recognition capabilities, historical information, reference points (e.g., one or more objects 111, beacons 112 associated with one or more objects 111, or the like), or the like, as well as various combinations thereof. The localization of the AR user device within the smart environment may include a position of the AR user device within the smart environment (e.g., an absolute position, a relative position, or the like), an orientation of the AR user device within the smart environment (e.g., the direction in which the AR user device is facing, a representation of the field of view of the AR user device, or any other suitable orientation information), or the like. The localization of the AR user device within the smart environment may be (1) determined on the AR user device (e.g., where the AR user device receives a model of the smart environment from the smart environment representation management system) and provided to the smart environment representation management system, or (2) determined on the smart environment representation management system (e.g., where the AR user device provides the imagery captured by the ToF camera of the AR user device to the smart environment representation management system). The localization of the AR device within the smart environment may be determined based on a precise localization technique (e.g., GPS positioning for an outdoor smart environment, indoor localization for an indoor smart environment, or the like). The AR user device has a field of view associated therewith.

At step 820, beacon localization information, indicative of a localization of a beacon detected as being within the field of view of the AR user device, is determined based on the localization of the AR user device.

At step 830, a determination is made, based on the beacon localization information, whether an object is registered as having a localization matching the localization of the beacon. In at least some embodiment, the determination as to whether an object is registered as having a localization matching the localization of the beacon may be performed by searching object registration information to determine whether the object registration information includes an object having object localization information indicative of a localization of the object that matches the localization of the beacon. In at least some embodiments, a match of the localization of the object and the localization of the beacon may be an absolute match (e.g., the coordinates are identical or other location information is identical) or a determination that the localization of the object and the localization of the beacon are sufficiently close that it is likely, or at least reasonably likely, that the detected beacon is associated with that object (e.g., the localizations are not identical, but the difference in localizations satisfies a threshold, where it will be appreciated that the threshold may vary based on one or more factors (e.g., the type or size of the environment, the number of objects deployed or expected to be deployed within the environment, or the like, as well as various combinations thereof)).

At step 840, a management action is performed based on the determination as to whether an object is registered as having a localization matching the localization of the beacon.

In at least some embodiments, performing the management action may include, based on a determination that no object is registered as having a localization matching the localization of the beacon, identifying an object associated with the beacon and determining whether the object associated with the beacon is registered as being associated with the environment. The identification of the object associated with the beacon may include identifying the object associated with the beacon based on information received from the beacon, or determining an identifier of the beacon and determining the object associated with the beacon based on a mapping of the identifier of the beacon to the object associated with the beacon. The management action may include, based on a determination that the object associated with the beacon is registered as being associated with the environment, one or more of generating a message indicative that the object associated with the beacon is registered as being associated with the environment and that object localization information for the object associated with the beacon does not match the beacon localization information of the beacon, generating a message related to updating of the localization information for the object associated with the beacon (e.g., a request message requesting that a user update the localization information for the object associated with the beacon, a message requesting a user to respond with an indication as to whether the localization information for the object associated with the beacon is to be updated, or the like), generating a message related to movement of the object associated with the beacon to a new location within the environment (e.g., a request message requesting that a user move the object associated with the beacon to a new location within the environment, a message requesting a user to respond with an indication as to whether the object associated with the beacon is to be moved to a new location within the environment, or the like), or the like. The management action may include, based on a determination that the object associated with the beacon is not registered as being associated with the environment, determining object registration information for the object associated with the beacon and initiating storage of the object registration information for the object associated with the beacon. The object registration information may be determined from at least one of information received from the beacon or information received via at least one user input interface. The object registration information may include at least one of an identifier of the object associated with the beacon, object localization information for the object associated with the beacon, or object characteristic or capability information for the object associated with the beacon.

In at least some embodiments, performing the management action may include, based on a determination that no object is registered as having a localization matching the localization of the beacon, determining object registration information for an object associated with the beacon and initiating storage of the object registration information for the object associated with the beacon. The object registration information may be determined from at least one of information received from the beacon or information received via at least one user input interface. The object registration information may include at least one of an identifier of the object associated with the beacon, object localization information for the object associated with the beacon, or object characteristic or capability information for the object associated with the beacon.

In at least some embodiments, performing the management action may include, based on a determination that no object is registered as having a localization matching the localization of the beacon, generating a message related to updating of object localization information for the object (e.g., a request message requesting that a user update object localization information for the object, a message requesting a user to respond with an indication as to whether object localization information for the object is to be updated, or the like) or generating a message related to movement of an object to a new location within the environment (e.g., a request message requesting that a user move an object to a new location within the environment, a message requesting a user to respond with an indication as to whether a object is to be moved to a new location within the environment, or the like), or the like.

In at least some embodiments, performing the management action may include, based on a determination that an object is registered as having a localization matching the localization of the beacon, obtaining, from the beacon, detected object configuration information associated with the object registered as having a localization matching the localization of the beacon, obtaining registered object configuration information associated with the object registered as having a localization matching the localization of the beacon; and comparing the detected object configuration information and the registered object configuration information. The management action may include, based on a determination that the detected object configuration information and the registered object configuration information do not match, updating the registered object configuration information based on the detected object configuration information. The management action may include, based on a determination that the detected object configuration information and the registered object configuration information do not match, performing at least one of generating a message indicative that the detected object configuration information and the registered object configuration information do not match, generating a message related to updating of registered object configuration information based on the detected object configuration information (e.g., a request message requesting that a user update registered object configuration information based on the detected object configuration information, a message requesting a user to respond with an indication as to whether the registered object configuration information is to be updated based on the detected object configuration information, or the like), generating a message related to reconfiguration of the object based on the detected object configuration information (e.g., a request message requesting that a user reconfigure the object based on the detected object configuration information, a message requesting a user to respond with an indication as to whether the object is to be reconfigured based on the detected object configuration information, or the like), or the like.

In at least some embodiments, performing the management action may include or otherwise be based on embodiments depicted and described with respect to one or more of method 500 of FIG. 5, method 600 of FIG. 6, or method 700 of FIG. 7.

At step 899, method 800 ends. It will be appreciated that, although depicted and described as ending (for purposes of clarity), method 800 may continue to be performed or may be re-executed under various conditions (e.g., periodically as the user of the AR user device moves around the smart environment and the AR user device captures more imagery of the smart environment, responsive to a manual indication by a user of the AR user device for the AR user device to capture more imagery of the smart environment, or the like, where these and other usage scenarios are discussed in additional above).

Figure 9:
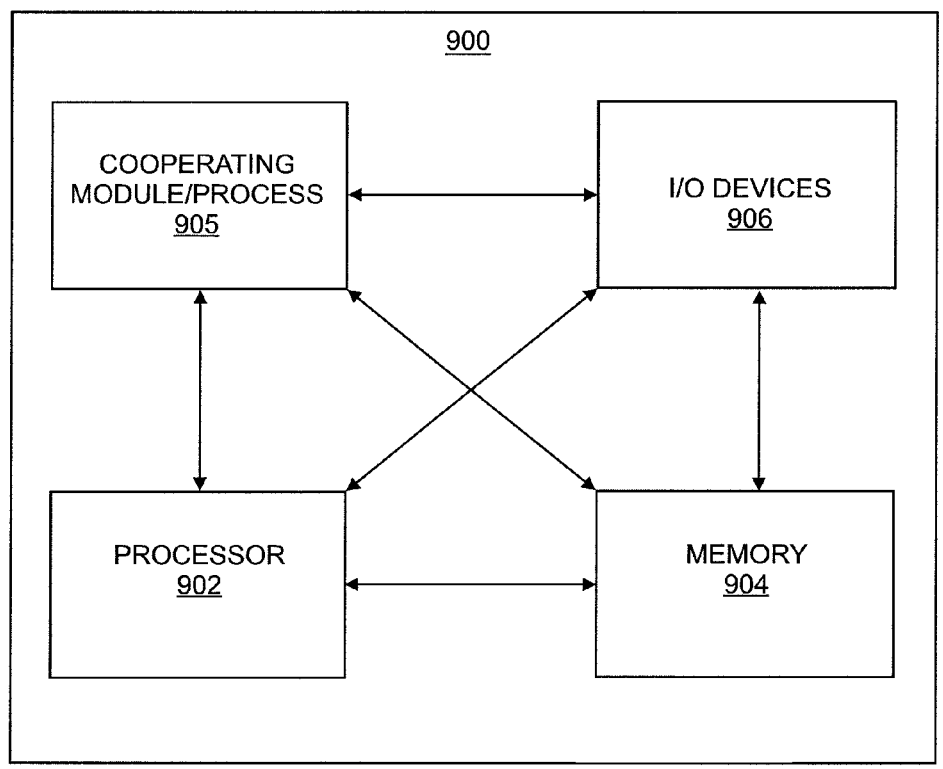
FIG. 9 depicts a high-level block diagram of a computer suitable for use in performing functions presented herein.

FIG. 9 depicts a high-level block diagram of a computer suitable for use in performing functions described herein.

The computer 900 includes a processor 902 (e.g., a central processing unit (CPU) and/or other suitable processor(s)) and a memory 904 (e.g., random access memory (RAM), read only memory (ROM), and the like).

The computer 900 also may include a cooperating module/process 905. The cooperating process 905 can be loaded into memory 904 and executed by the processor 902 to implement functions as discussed herein and, thus, cooperating process 905 (including associated data structures) can be stored on a computer readable storage medium, e.g., RAM memory, magnetic or optical drive or diskette, and the like.

The computer 900 also may include one or more input/output devices 906 (e.g., a user input device (such as a keyboard, a keypad, a mouse, and the like), a user output device (such as a display, a speaker, and the like), an input port, an output port, a receiver, a transmitter, one or more storage devices (e.g., a tape drive, a floppy drive, a hard disk drive, a compact disk drive, and the like), or the like, as well as various combinations thereof).

It will be appreciated that computer 900 depicted in FIG. 9 provides a general architecture and functionality suitable for implementing functional elements described herein and/or portions of functional elements described herein. For example, computer 900 provides a general architecture and functionality suitable for implementing one or more of an object 111, a beacon 112, AR user device 120, smart environment representation management system 140, or the like.

It will be appreciated that the functions depicted and described herein may be implemented in software (e.g., via implementation of software on one or more processors, for executing on a general purpose computer (e.g., via execution by one or more processors) so as to implement a special purpose computer, and the like) and/or may be implemented in hardware (e.g., using a general purpose computer, one or more application specific integrated circuits (ASIC), and/or any other hardware equivalents).

It will be appreciated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

It will be appreciated that the term "or" as used herein refers to a non-exclusive "or," unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
a processor and a memory communicatively connected to the processor, the processor configured to:
determine a localization of a device within an environment comprising a physical area having a set of objects located therein, the device having a field of view associated therewith;
determine, based on the localization of the device, detected beacon localization information indicative of a detected localization of a beacon detected as being within the field of view of the device;
determine, based on the field of view of the device and object registration information associated with the environment, a set of registered objects registered as being within the field of view of the device and associated object localization information for the set of registered objects registered as being within the field of view of the device;
determine, based on the detected beacon localization information and the object localization information for the set of registered objects registered as being within the field of view of the device, whether an object is registered as having a registered localization matching the detected localization of the beacon, wherein the determination as to whether an object is registered as having a registered localization matching the detected localization of the beacon comprises a determination as to whether the object localization information for the set of registered objects registered as being within the field of view of the device is indicative that an object of the set of objects is registered as having a registered localization matching the detected localization of the beacon; and
perform a management action based on the determination as to whether an object is registered as having a registered localization matching the detected localization of the beacon.

2. The apparatus of claim 1, wherein the processor is configured to determine the localization of the device within the environment based on at least one of:
a model of the physical area and imagery captured by a camera of the device; or
an indoor location determination technique.

3. The apparatus of claim 1, wherein, to perform the management action, the processor is configured to:
based on a determination that no object is registered as having a registered localization matching the detected localization of the beacon:
identify an object associated with the beacon; and
determine whether the object associated with the beacon is registered as being associated with the environment.

4. The apparatus of claim 3, wherein, to identify the object associated with the beacon, the processor is configured to:
identify the object associated with the beacon based on information received from the beacon; or determine an identifier of the beacon, and identify the object associated with the beacon based on a mapping of the identifier of the beacon to the object associated with the beacon.

5. The apparatus of claim 3, wherein the processor is configured to:
based on a determination that the object associated with the beacon is registered as being associated with the environment:
generate a message indicative that the object associated with the beacon is registered as being associated with the environment and that the object localization information for the object associated with the beacon does not match the detected beacon localization information of the beacon;
generate a message related to updating of the object localization information for the object associated with the beacon; or
generate a message related to movement of the object associated with the beacon to a new location within the environment.

6. The apparatus of claim 3, wherein the processor is configured to:
based on a determination that the object associated with the beacon is not registered as being associated with the environment:
determine object registration information for the object associated with the beacon; and
initiate storage of the object registration information for the object associated with the beacon.

7. The apparatus of claim 6, wherein the object registration information for the object associated with the beacon is determined from at least one of information received from the beacon or information received via at least one user input interface.

8. The apparatus of claim 6, wherein the object registration information for the object associated with the beacon comprises at least one of an identifier of the object associated with the beacon, object localization information for the object associated with the beacon, or object characteristic or capability information for the object associated with the beacon.

9. The apparatus of claim 1, wherein, to perform the management action, the processor is configured to:
based on a determination that no object is registered as having a registered localization matching the detected localization of the beacon:
determine object registration information for an object associated with the beacon; and
initiate storage of the object registration information for the object associated with the beacon.

10. The apparatus of claim 9, wherein the object registration information is determined from at least one of information received from the beacon or information received via at least one user input interface.

11. The apparatus of claim 9, wherein the object registration information comprises at least one of an identifier of the object associated with the beacon, object localization information for the object associated with the beacon, or object characteristic or capability information for the object associated with the beacon.

12. The apparatus of claim 1, wherein, to perform the management action, the processor is configured to:
based on a determination that no object is registered as having a registered localization matching the detected localization of the beacon:

generate a message related to updating of object localization information for an object associated with the beacon; or
generate a message related to movement of an object associated with the beacon to a new location within the environment.

13. The apparatus of claim 1, wherein, to perform the management action, the processor is configured to:
based on a determination that an object is registered as having a registered localization matching the detected localization of the beacon:
obtain, from the beacon, detected object configuration information associated with the object registered as having a registered localization matching the detected localization of the beacon;
obtain registered object configuration information associated with the object registered as having a registered localization matching the detected localization of the beacon; and
compare the detected object configuration information and the registered object configuration information.

14. The apparatus of claim 13, wherein the processor is configured to:
based on a determination that the detected object configuration information and the registered object configuration information do not match:
update the registered object configuration information based on the detected object configuration information.

15. The apparatus of claim 13, wherein the processor is configured to:
based on a determination that the detected object configuration information and the registered object configuration information do not match:
generate a message indicative that the detected object configuration information and the registered object configuration information do not match;
generate a message related to updating of the registered object configuration information based on the detected object configuration information; or
generate a message related to reconfiguration of the object based on the registered object configuration information.

16. The apparatus of claim 1, wherein the apparatus is the device or a network device configured for communication with the device.

17. The apparatus of claim 1, wherein the device comprises an augmented reality device.

18. The apparatus of claim 1, wherein the apparatus further comprises:
a time-of-flight camera configured to capture imagery of the environment.

19. A non-transitory computer-readable storage medium storing instructions which, when executed by a computer, cause the computer to perform a method, the method comprising:
determining a localization of a device within an environment comprising a physical area having a set of objects located therein, the device having a field of view associated therewith;
determining, based on the localization of the device, detected beacon localization information indicative of a detected localization of a beacon detected as being within the field of view of the device;
determining, based on the field of view of the device and object registration information associated with the environment, a set of registered objects registered as being within the field of view of the device and associated object localization information for the set of registered objects registered as being within the field of view of the device;

determining, based on the detected beacon localization information and the object localization information for the set of registered objects registered as being within the field of view of the device, whether an object is registered as having a registered localization matching the detected localization of the beacon, wherein the determination as to whether an object is registered as having a registered localization matching the detected localization of the beacon comprises a determination as to whether the object localization information for the set of registered objects registered as being within the field of view of the device is indicative that an object of the set of objects is registered as having a registered localization matching the detected localization of the beacon; and performing a management action based on the determination as to whether an object is registered as having a registered localization matching the detected localization of the beacon.

20. A method, comprising:

determining, by a processor, a localization of a device within an environment comprising a physical area having a set of objects located therein, the device having a field of view associated therewith;

determining, by the processor based on the localization of the device, detected beacon localization information indicative of a detected localization of a beacon detected as being within the field of view of the device;

determining, by the processor based on the field of view of the device and object registration information associated with the environment, a set of registered objects registered as being within the field of view of the device and associated object localization information for the set of registered objects registered as being within the field of view of the device;

determining, by the processor based on the detected beacon localization information and the object localization information for the set of registered objects registered as being within the field of view of the device, whether an object is registered as having a registered localization matching the detected localization of the beacon, wherein the determination as to whether an object is registered as having a registered localization matching the detected localization of the beacon comprises a determination as to whether the object localization information for the set of registered objects registered as being within the field of view of the device is indicative that an object of the set of objects is registered as having a registered localization matching the detected localization of the beacon; and performing, by the processor, a management action based on the determination as to whether an object is registered as having a registered localization matching the detected localization of the beacon.

* * * * *